United States Patent [19]
Manning

[11] Patent Number: 5,897,700
[45] Date of Patent: Apr. 27, 1999

[54] APPARATUS AND INTEGRATED PROCESS FOR RECLAIMING PAPER MILL SLUDGE AND PRODUCING USEFUL PRODUCTS THEREFROM

[75] Inventor: Harold J. Manning, Pasco, Wash.

[73] Assignee: Cerad Industries, Inc., Sand Springs, Okla.

[21] Appl. No.: 08/833,667

[22] Filed: Apr. 8, 1997

[51] Int. Cl.[6] .................................................. C04B 16/02
[52] U.S. Cl. ........................ 106/697; 106/793; 106/796; 588/256; 588/257; 210/751; 210/928; 162/4; 162/DIG. 9
[58] Field of Search .................................... 106/697, 793, 106/796; 588/256, 257; 210/751, 928; 162/4, DIG. 9

[56] References Cited

U.S. PATENT DOCUMENTS

| Re. 33,983 | 7/1992 | Hughes | 119/173 |
|---|---|---|---|
| 4,560,527 | 12/1985 | Harke et al. | 162/DIG. 9 |
| 4,621,011 | 11/1986 | Fleischer et al. | 428/221 |
| 5,000,115 | 3/1991 | Hughes | 119/173 |
| 5,019,564 | 5/1991 | Lowe | 514/75 |
| 5,129,365 | 7/1992 | Hughes | 119/173 |
| 5,317,990 | 6/1994 | Hughes | 119/173 |
| 5,372,314 | 12/1994 | Manning | 241/21 |
| 5,386,803 | 2/1995 | Hughes | 119/173 |
| 5,456,737 | 10/1995 | Manning | 71/16 |
| 5,503,111 | 4/1996 | Hughes | 119/173 |
| 5,505,774 | 4/1996 | Manning | 106/697 |
| 5,510,310 | 4/1996 | Manning | 502/412 |

OTHER PUBLICATIONS

Patent Abstracts of Japan, vol. 005, No. 041 (C–407), Mar. 18, 1981 –& JP 55 165134 A (Ito Yasuro), Dec. 23, 1980. See abstract.

Patent Abstracts of Japan, vol. 014, No. 446 (C–0763), Sep. 25 1990 –& JP 02 175644 A (Kubota Ltd), Jul. 6, 1990. See abstract.

Database WPI, Section Ch, Week 8824, Derwent Publications Ltd, London, GB; AN 88–164680, XP002071280 –& JP 63 102 618 A (Daiichi Yakka Kogyo). See abstract.

*Primary Examiner*—Paul Marcantoni
*Attorney, Agent, or Firm*—Fellers, Snider, Blankenship, Bailey & Tippens, P.C.

[57] ABSTRACT

Paper mill sludge is reclaimed and useful products produced therefrom. A predetermined amount of paper mill sludge is continuously discharged from a storage reservoir onto a mixer/conveyor to create a first reactant stream. A predetermined amount of calcium oxide is input into the first reactant stream from a calcium oxide reservoir. The calcium oxide and paper mill sludge are mixed as they travel along the mixer/conveyor to form a first intermediate mixture. After a time period sufficient to allow for the reaction of the calcium oxide and paper mill sludge, a predetermined amount of diatomite is added to the reactant stream from a diatomite storage reservoir. The first reactant stream, now comprising the first intermediate mixture of paper mill sludge and calcium oxide combined with diatomite, forms a useful, environmentally safe product.

20 Claims, 5 Drawing Sheets

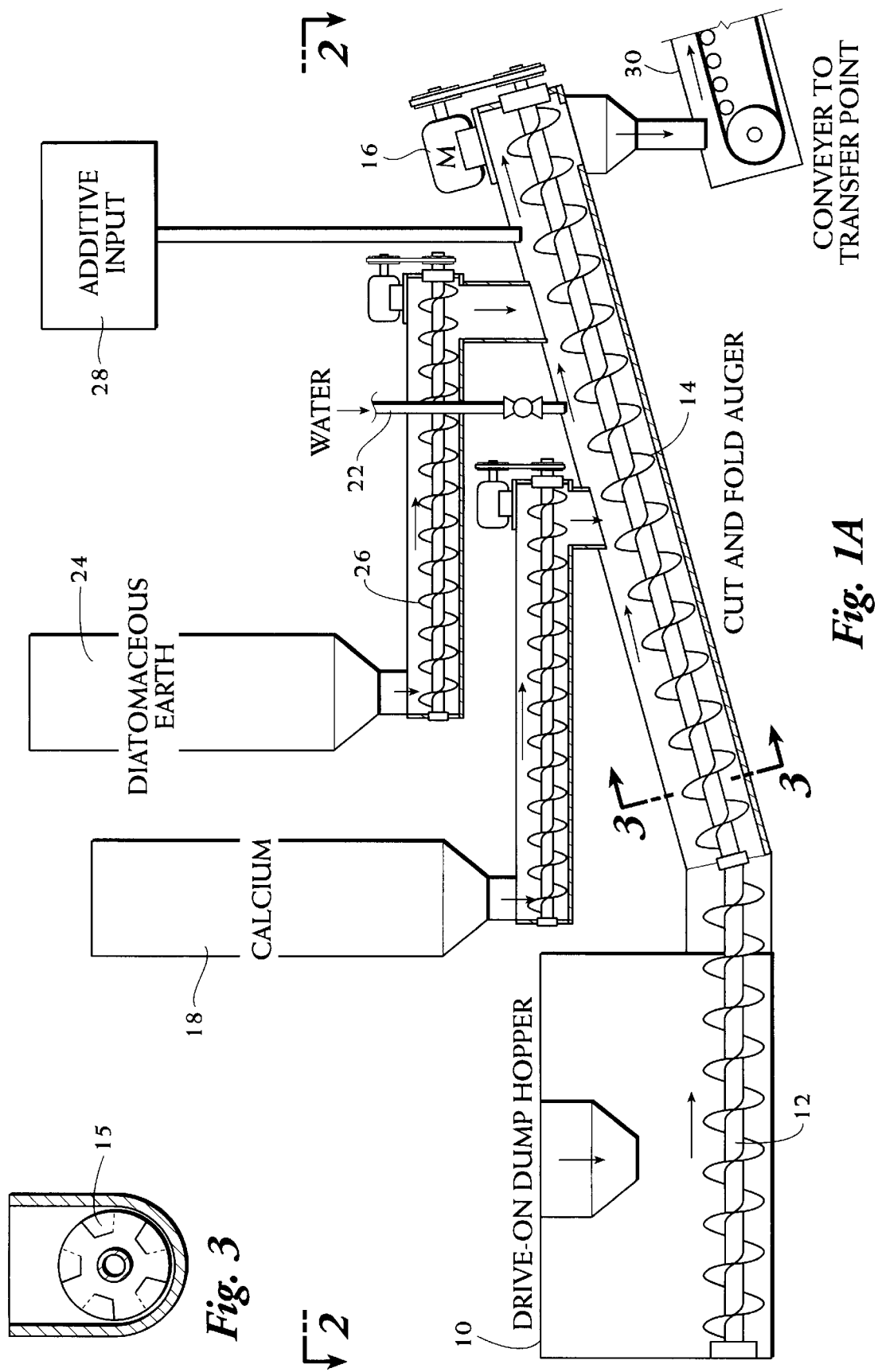

APPARATUS AND INTEGRATED PROCESS FOR RECLAIMING PAPER MILL SLUDGE AND PRODUCING USEFUL PRODUCTS THEREFROM

BACKGROUND OF THE INVENTION

1. Technical Field

This invention relates generally to an apparatus and process for reclaiming paper mill sludge and to useful products derived therefrom, and, more specifically, to a safe, energy efficient, fully integrated system for recycling paper mill sludge to obtain a wide variety of ecologically safe products.

2. Background

It is well known that waste cellulosic fiber and paper mill sludge, which are produced in large quantities in most industrial nations of the world today due to the large usage of paper, constitute one of our most serious environmental problems. Paper mill sludge has substantially little usage as a material that can be employed in other industrial applications. Because of its non-utility, the paper mill sludge is merely discarded, along with other waste cellulosic fiber. This creates a tremendous disposal problem as paper mill sludge contains many environmental contaminants.

In U.S. Pat. No. 5,505,774 this inventor disclosed a continuous flow process for treating paper mill sludge utilizing calcium oxide and silica. In this process calcium oxide and silica were simultaneously and continuously discharged along with a paper mill sludge slurry into a primary blender, where the components were blended.

This inventor also has utilized calcium oxide and silica in methods of treating waste cellulosic fibrous material to obtain useful products such as animal waste absorbent materials, soil supplements and floor dry materials.

In U.S. Pat. No. 5,372,314 a method of manufacturing animal bedding material is disclosed. In this process waste cellulosic fibrous material is finely shredded after which any metal component is removed. The shredded fibrous material is then mixed with calcium oxide and water until a temperature of about 120–140° F. is achieved. This mixture is then neutralized with silica diatomite plankton or non-swelling clay to obtain a final mixture. The end product is especially useful as cat litter.

The process of U.S. Pat. No. 5,456,737, a continuation-in-part of the '314 patent, involves shredding and demetalling waste cellulosic fibrous material and then thoroughly mixing the fibrous material with an agricultural wetting agent and a milk of lime. Similar to the '314 process, this mixture is then neutralized with silica diatomite plankton or non-swelling clay to obtain a final mixture.

U.S. Pat. No. 5,510,310, also a continuation-in-part of the '314 patent, relates to a method for manufacturing a floor dry material from shredded and demetalled fibrous material. The fibrous material is mixed with a biodegradable surfactant, calcium oxide and water, after which a citric based solvent degreaser and silica diatomite plankton or non-swelling clay are added.

U.S. Pat. Nos. 5,372,314; 5,456,737; 5,505,774 and 5,510,310 are incorporated herein by reference.

While the above referenced methods of reclaiming or recycling paper mill sludge and waste cellulosic fibrous material provide safe and useful end products, there exists a need for an integrated process from which a single source of paper mill sludge can be utilized in an economical, safe (explosion resistant) continuous flow procedure to output environmentally acceptable products for different end-use applications. This need has not been fulfilled by others who have utilized paper mill sludge or waste cellulosic fibrous materials to form agglomerated cellulosic particles.

In particular, U.S. Pat. No. 4,799,961 to Friberg discloses the use of pulped paper or waste material from paper mills as part of a process for forming cementitious fiber impregnated construction compositions. But the Friberg process has certain limitations that make its commercial application of questionable feasibility.

U.S. Pat. No. 4,621,011 discloses a cellulosic particle manufactured by agglomerating a fibrous cellulosic feed material in the presence of water, compacting the surface of the agglomerated particles, and drying the particles.

U.S. Pat. No. 5,019,564 provides an agricultural granule for carrying and releasing an incorporated biocidal or nutritional agricultural chemical. The granule is formed by the agitative agglomeration of a plant fiber slurry, such as primary de-inked paper sludge.

U.S. Pat. Nos. 4,621,011, 4,799,961 and 5,019,564 are incorporated herein by reference. None of these patents, however, provides an integrated process for reclaiming paper mill sludge and none addresses the treatment of paper mill sludge or waste cellulosic materials to ensure that the resulting end product is substantially free of environmentally deleterious materials.

Thus, the object of the present invention is to provide such an integrated system for reclaiming paper mill sludge and waste cellulosic fibrous material such that a variety of useful, environmentally safe products can be manufactured in a continuous flow procedure.

It is a further object of the present invention that the continuous flow procedure be safe to operate and explosion resistant.

SUMMARY OF THE INVENTION

This object is achieved in a integrated manufacturing process having certain common and alternate product pathways for the production of different products originating from a common paper mill sludge source and produced via a safe stepwise addition of reactants. The paper mill sludge is fully treated to neutralize all contaminants contained therein and the products obtained are environmentally safe.

A predetermined amount of paper mill sludge is continuously discharged from a storage reservoir onto a mixer/conveyor to create a reactant stream. A predetermined amount of calcium oxide is input into the reactant stream from a calcium oxide reservoir. The calcium oxide and paper mill sludge are mixed as they travel along the mixer/conveyor to form an intermediate mixture. After a time period sufficient to allow for the reaction of the calcium oxide and paper mill sludge but before an explosion hazard is presented, a predetermined amount of diatomite is added to the reactant stream from a diatomite storage reservoir. The reactant stream, now comprising the intermediate mixture of paper mill sludge and calcium oxide combined with diatomite, forms a base product mass. A portion of the base product mass can be removed from the process at this point.

The base product mass, or that portion of the base product mass remaining, is then optionally routed to a shaper/mixer, such as a rotating trundle, where the base product mass is shaped into generally spheroidal agglomerations. After shaping, or if shaping is not desired, the base product mass proceeds downstream where it is continuously discharged and conveyed to and through a dryer from which is output a dried or partially dried base product mass.

This dried base product mass is in the form of particles, granules or agglomerations. A separator is used to separate the particles according to particle size to form segregated base product particles. The segregated base product particles are then ready for admixture with other components to form alternate end products.

In one aspect of the invention, additives such as fertilizers, microbes, humic acid or other soil conditioners are added to the base product mass or to dried base product particles to obtain a first end product such as a soil supplement or agricultural carrier. This first end product is removed from the manufacturing process at this stage.

Another end product is a floor dry material used to clean up and absorb spills, such as spilled hydrocarbons. Surfactants or degreasers are added to the base product mass or dried base product particles to obtain an exceptional floor dry product.

A cat litter or animal bedding material is obtained by combining the base product mass or dried base product particles with optional ingredients such as fragrances and cedar chips. Shredded paper is sometimes added for large animal uses. Bentonite can also be added in amounts up to 50 weight percent of the product to obtain a high quality cat litter with exceptional agglomeration characteristics.

Another interesting end product is obtained from that portion of the dried base product particles having a fine micron size. These fine base product particles are mixed with additional diatomite to obtain a material that is extremely fire resistant. This material can be added to plastics to make a fire retardant product, such as can be employed in the manufacture of roofing shingles and other construction materials.

The dried base product material can also be used as cellulosic insulation when applied in walls, attics or other structures. Sodium silicate can be added to the base product material to allow it to be easily blown into place, and a fire retardant, such as boric acid, can be added to provide additional protection.

The dried base product material can also be used as an agricultural carrier. Insecticides, herbicides, pesticides and fertilizers can be added to the base product particles to form an end product which effectively distributes the agricultural chemical while at the same time provides added texture to the soil.

A better understanding of the invention and its objects and advantages will become apparent to those skilled in this art from the following detailed description, taken in conjunction with the attached drawings, wherein there is shown and described only the preferred embodiment of the invention, simply by way of illustration of the best mode contemplated for carrying out the invention. As will be realized, the invention is capable of modifications in various obvious respects, all without departing from the invention. Accordingly, the description should be regarded as illustrative in nature and not as restrictive.

BRIEF DESCRIPTION OF THE DRAWINGS

FIGS. 1A–D is a schematic diagram of the integrated manufacturing process according to the present invention.

FIG. 3 is a cross sectional view of the cut and fold auger taken along line 3—3 of FIG. 1A.

DETAILED DESCRIPTION OF THE PREFERRED EMBODIMENTS

Figure 1B:
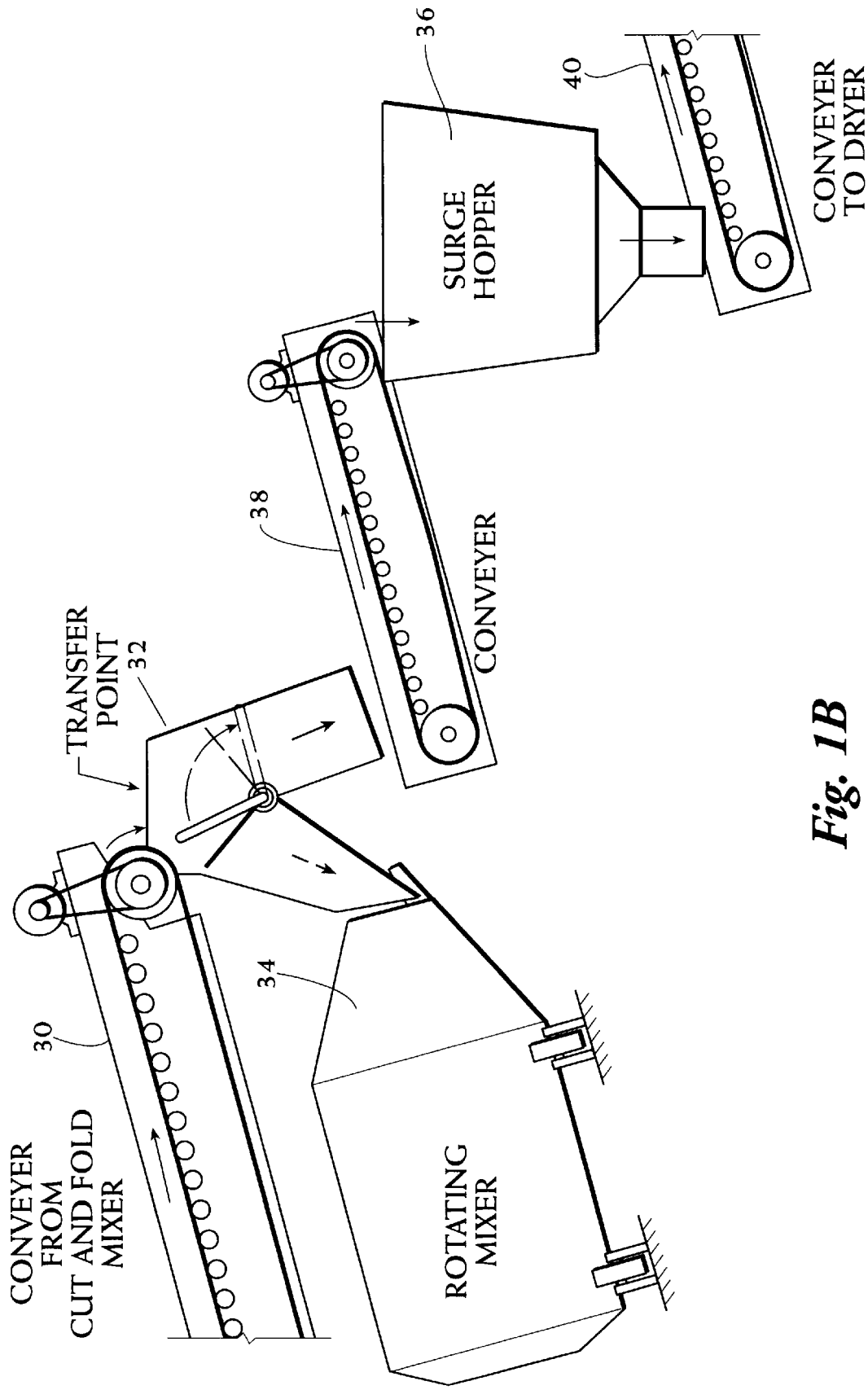

Paper mill sludge is a byproduct of the production of paper and typically is an environmental contaminant. The disposal of paper mill sludge has been an ecological problem throughout the world. One deleterious aspect of paper mill sludge is that it typically contains harmful chemical contaminants that have been identified as a potential cause of cancer and birth defects. "Contaminants" as used herein means all toxic or carcinogenic substances carried by acidic water in paper mill waste sludge, including phenols, heavy metals and compounds of heavy metals. Heretofore utilized methods of disposing of paper mill sludge have been unacceptable since the typical methods have included burning or burial. Burning the paper mill sludge is an expensive method of disposal since before the paper mill waste can be burned it must be dried and in the drying process the removal of water must be conducted in such a way that it does not carry the contaminants into the environment. Burial of the material only conceals the contaminants therein. The contaminants can leach into ground water and remain as a constant potential environmental hazard. Under the principles of this invention paper mill waste sludge is moved directly from the paper manufacturing process into a sludge storage reservoir from which it is continuously fed into an integrated process for its reclamation.

The composition of paper mill sludge varies slightly depending upon the particular manufacturer from which it is obtained. Paper mill sludge generally comprises cellulosic fibrous materials, water, and fillers, in addition to contaminants. Normal paper mill sludge has a solids content of 40–90 weight percent fiber (the fibers are typically 500–1000 microns in length) and 10–60 weight percent filler. Fillers include such materials as kaolin clay, baryites, titanium dioxide and other plant fibers. Clay is the most important of the filler components. Some paper mill sludges might have a negligible or very low (3–5 percent) clay content by weight, while others might have up to a 40 percent clay content by weight. Raw paper mill sludge has a usual water content ranging from 60–90 weight percent. As used herein the term "paper mill sludge" encompasses byproducts of the production of paper as described above, mixtures of said byproducts and waste cellulosic fibrous materials, slurried waste cellulosic fibrous material and slurried plant fibrous materials.

Lime is derived through the decarbonation of limestone. It is manufactured by calcining (burning) high-purity calcitic or dolomitic limestone at temperatures ranging from 980° C. to 1,320° C. The calcination process drives off most of the carbon dioxide, forming calcium oxide (CaO) or "quicklime," which can be hydrated to form hydrated lime or calcium hydroxide ($Ca(OH)_2$). Lime is consumed in a variety of diverse markets including water and waste treatment, metallurgy, environmental applications, and in the pulp and paper, construction, agriculture and chemical industries. Commercial quicklimes are most often classified as either a high calcium quicklime or a dolomitic quicklime. Both high calcium quicklimes and dolomitic quicklimes have calcium oxide as the primary component. High calcium quicklimes are almost entirely comprised of calcium oxide with perhaps very small amounts of magnesium, silica, iron or aluminum oxide, water and carbon dioxide being present. Dolomitic quicklimes usually contain 50–60 percent calcium oxide and 35–40 percent magnesium oxide (MgO), along with very small amounts of silica, iron or aluminum oxide, water and carbon dioxide. As used herein, the term "calcium oxide" encompasses materials derived through the calcination of limestone including pure calcium oxide and high calcium and dolomitic quicklimes and further including chemicals produced by the calcination process followed by hydration such as hydrated lime or calcium hydroxide.

When calcium oxide is added to paper mill sludge an exothermic reaction occurs. The heat of reaction, and primarily the hydrolization of the calcium oxide, helps absorb excess moisture from the sludge. Hydration or slaking of calcium oxide generally occurs formulaically as follows (with a heat of reaction at 25° C.):

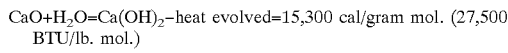
$CaO+H_2O=Ca(OH)_2$–heat evolved=15,300 cal/gram mol. (27,500 BTU/lb. mol.)

The fibrous material contained in the sludge absorbs the excess heat of the exothermic reaction and expands from a compacted state to break down into a very fine fiber that will accept and hold additional materials. The addition of calcium oxide to the paper mill sludge also raises the pH of the sludge to 10.5–11. This excess alkalinity treatment works to disinfect the mixture against bacteria and some virus types. It also removes most heavy metals. The reaction of calcium oxide combined with the effect of the exothermically generated heat successfully treats the water absorbed by the blotting effect of paper fiber, neutralizing all phenolic components and coating any heavy metals.

Paper mill sludge is also known to have an objectionable odor. The addition of calcium oxide to paper mill sludge reduces odor because of the high pH established. Stabilizing the sludge with calcium oxide reduces the number of odor-producing bacteria.

Diatomite, also called diatomaceous earth, is a light friable siliceous material derived chiefly from the frustules of minute planktonic unicellular or colonial algae (diatoms). Diatomite is incoherent, mealy and extremely porous. Its color can vary from white to yellowish or gray. Diatomite has been mined from marine and freshwater deposits around the world for centuries. Its chemical composition is highly variable from outcrop to outcrop, but high grade diatomite is more than 80% silica dioxide ($SiO_2$). The use of diatomite for industrial purposes, such as isolation and filtration processes, relies on its extremely high porosity and low density. Diatomite also has a natural sorptive quality that is unparalleled. It has the ability to absorb about 2.5 times its weight.

In connection with the present invention diatomite serves several functions. It acts as a buffer by neutralizing the mixture of paper mill sludge and calcium oxide and guards against explosion of the sludge/calcium oxide mixture. It should be understood, however, that the products produced in connection with the present invention need not be of a completely neutral pH. Rather the pH of the products can be adjusted for specific applications and requirements. Other pH adjusting compositions can be utilized as additives. Its absorptive capabilities are also utilized in so far as the diatomite reduces still further the water content of the mixture and performs as a carrier for additives. The sorptive characteristic of the diatomite prevents leaching of additives, such as nitrates from nitrogen fertilizers, from the product.

When combined with the mixture of paper mill sludge and calcium oxide the diatomite also works as an excellent binder. Because the diatomite is generally finely ground to particle sizes of 300–350 microns, it adds significantly to the surface area of the mixture and assists in the agglomeration of the product.

In general, a metered reactant stream is formed of paper mill sludge. Then a stepwise addition of calcium oxide and diatomite is carried out. Calcium oxide is added to the reactant stream to obtain an intermediate mixture. If the particular paper mill sludge being used has a relatively high clay content surfactants may be added to aid in the breakdown of the clay component. If surfactants are utilized they are added to the reactant stream just ahead of or in close proximity to the calcium oxide. The surfactants are preferably input with water at a ratio of about 2 percent by weight of the water. BREM 17 or 18 by Petrick USA are acceptable surfactants. For 1000 lbs. of paper mill sludge (based upon the dry weight of fiber), 25 gallons of water is added. After the calcium oxide has had the opportunity to fully react with the paper mill sludge, the diatomite is input into the reactant stream. After thorough mixing an agglomerated base product mass is obtained. This base product mass itself (with or without additives) might be used as an end product, such as a soil conditioner, waste absorbent material, oil absorbent, etc., or the base product mass can be routed further downstream for shaping, drying or partial drying, separation, additive addition and packaging.

Figure 1C:
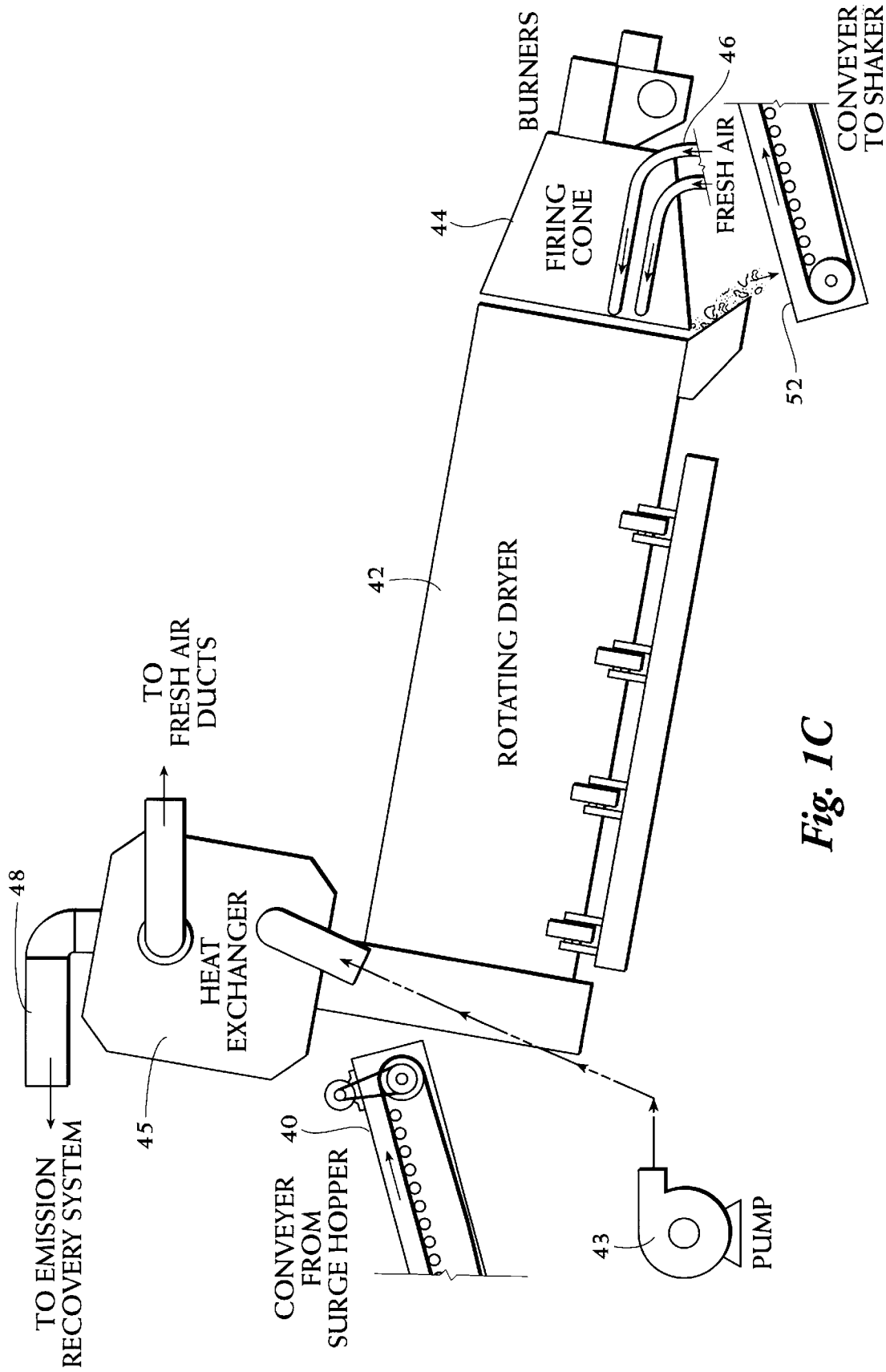
Figure 1D:
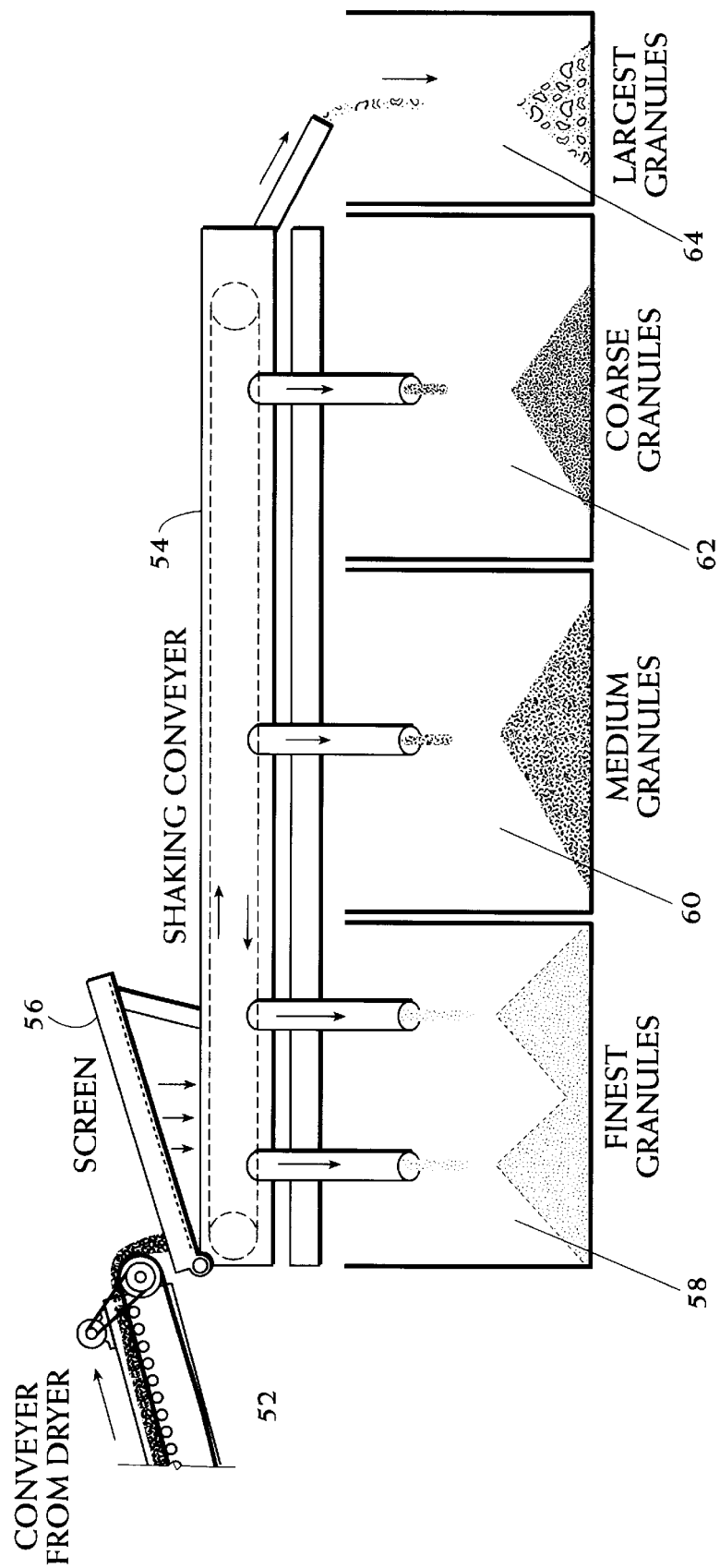
Figure 2:
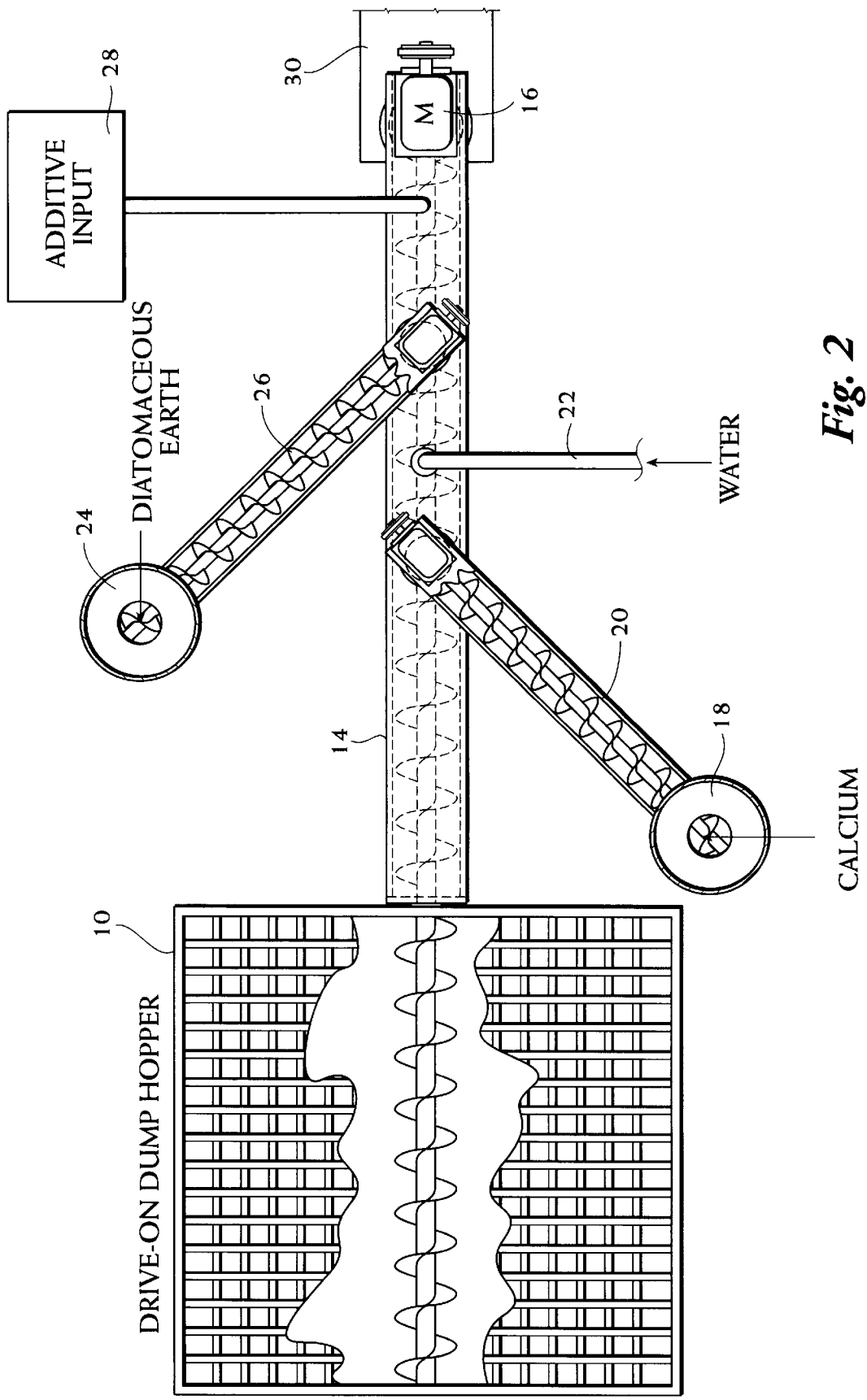
FIG. 2 is a plan view of FIG. 1A taken along line 2—2.

Reference will now be made to FIGS. 1–3. In the preferred integrated process for reclaiming paper mill sludge the sludge is kept in a storage reservoir such as a drive-on dump hopper 10. At the bottom of the dump hopper 10 there is an auger 12 for conveying the paper mill sludge to the upstream end of a mixer/conveyor unit 14. By varying the size or speed of rotation of the auger 12 the amount of paper mill sludge discharged onto the mixer/conveyor 14 can be controlled. If necessary, the paper mill sludge or waste cellulosic fibrous material may be ground or shredded, such as by a hammermill (not shown), prior to being deposited into dump hopper 10. The predetermined amount of paper mill sludge delivered by the auger 12 onto the mixer/conveyor 14 creates a reactant stream.

Throughout this specification the preferred equipment is referenced. It should be understood, however, that this is provided to illustrate the best mode known at this time for carrying out the invention. The use of equivalent equipment or equipment of different dimensions should be understood to fall within the scope of this invention.

The preferred mixer/conveyor 14 is a cut and fold auger. A cross section of the cut and fold auger flighting 15 is shown in FIG. 3. It is inclined at an angle of about 15°. The mixer/conveyor 14 is powered by a motor 16. The preferred mixer/conveyor 14 is rated to discharge material at about 40 cubic yards per hour.

Additional reactants are input into the reactant stream as the paper mill sludge progresses downstream along the mixer/conveyor 14. Calcium oxide stored in a calcium oxide reservoir, such as silo 18, is input into the reactant stream in a measured fashion by a metering conveyor 20. Metering conveyor 20, and the other conveyors mentioned herein, may be material screws, belts, augers or other types of material conveyors. The metering conveyors are calibrated to revolutions per minute or cycles per second and, along with the mixer/conveyor specifications, this information is fed into a master panel (not shown) so that the feed rates of the reactants can be computer controlled. A water input 22 is in close proximity to the discharge point of the calcium oxide or may be combined with the calcium oxide discharge point. If necessary to obtain a full reaction of the calcium oxide with the paper mill sludge additional water can be input into the reactant stream through water input 22. If the paper mill sludge being utilized has a clay content sufficiently high to necessitate the use of surfactants, the surfactants are added to the reactant stream with water through water input 22. Water input 22 is shown in the drawings to be located just after the calcium oxide input, but it should be understood that this component can be placed upstream of, or be combined with, the calcium oxide input.

Though different dimensioned equipment can be utilized, it is important that the mixer/conveyor 14 have a larger diameter or working area than that of the sludge feed auger 12. This is because the paper mill sludge fibers expand as the calcium oxide is added to form the intermediate mixture. As an example, a 14 inch auger can be used as the sludge feed auger 12 in combination with a 24 inch mixer/conveyor 14. It is preferred to go up 40 percent in diameter to avoid clogging.

Diatomite stored in a diatomite reservoir 24 is input into the reactant stream downstream of the calcium oxide input. A predetermined amount diatomite is discharged into the reactant stream by a metering conveyor 26 at a point along the mixer/conveyor 14 that corresponds to a time lag of 3 to 60 seconds after the calcium oxide has been input. This time lag allows for the reaction of the calcium oxide with the paper mill sludge as described hereinabove. Once the diatomite has been added to the reactant stream, which now comprises paper mill sludge, calcium oxide, diatomite and perhaps surfactants, the reactant stream can be characterized as comprising a contaminant neutralized, environmentally safe base product mass.

The stepwise addition of reactants to the paper mill sludge stream is an important aspect of the present invention. The calcium oxide is added to the paper mill sludge stream to generate an exothermic reaction and provide an excess alkalinity treatment prior to the addition of the diatomite. The calcium oxide is mixed with the paper mill sludge for a period of 3 to 60 seconds prior to the admixture of the diatomite to the reactant stream. This allows for the full reaction of the calcium oxide with the paper mill sludge and further provides for the addition of a buffer prior to any threat of explosion.

Additional reactant inputs, such as indicated by the reference numeral 28, can be positioned downstream of the diatomite input along the mixer/conveyor 14 for the addition of optional additives. Some optional additives include agricultural acids such as humic acid or phos acid that may be input in order to further lower the pH of the base product mass. The base product mass itself may comprise a desired end product or, as described in more detail below, after additives are added through the additive input 28 a first end product may be obtained from the process.

Once the base product mass is obtained the portion that is not removed from the process is conveyed via a conveyor 30 to a transfer point 32 where the base product mass may either be shaped in a shaper/mixer 34 or delivered to a surge hopper 36. The shaper/mixer 34 shapes the base product mass into generally spheroidal agglomerations. It comprises a truck mixer, such as a cement mixer, mounted on a skid. If it is desired that the base product mass be shaped into generally spheroidal agglomerations the shaper/mixer 34 is used for such purpose and the output from the shaper/mixer 34 then travels to the surge hopper 36. If it is desired that the base product mass not be shaped, then the shaper/mixer 34 may be operated in reverse which immediately dumps the base product mass into the surge hopper 36 or the base product mass may be directly routed to the surge hopper 36. The base product mass or shaped base product mass is preferably delivered to the surge hopper 36 by a pipe conveyor 38.

From the surge hopper 36 the base product mass is transferred via a conveyor 40 to a dryer 42. The dryer 42 is in a declined orientation to assist in the flow of material through it. The dryer 42 may be a rotating sand dryer, a fluid bed dryer or a straight air dryer. The dryer 42 illustrated in the drawings is a rotating dryer having a firing cone 44 at which the temperature is approximately 1600–1700° F. The base product mass is conveyed through the dryer 42 and has a residency time of approximately 8 minutes. The exit temperature of the base product mass is approximately 250° F. The rolling action of the dryer 42 facilitates the formation of pellets. Fresh air is input into the dryer 42 via several air intakes 46. A pump 43 is connected to a heat exchanger 45 to provide fresh air and evacuate dead air. The dead air is taken off with a heat exchanger/steam vent 48 and is exhausted into an emissions control device (not shown), such as a cyclone for the recovery of aerosolized materials. Thus all emissions, including vaporized water and aerosolized small base product mass particles are recovered.

A dried base product mass is output from the dryer 42 onto a conveyor 52 for delivery to a shaking conveyor 54. The shaking conveyor 54 functions as a separator for receiving the dried base product mass and separating the mass based upon particle sizes to form segregated base product particles. The segregated base product particles are then ready for admixture with other components to form alternate end products. The shaking conveyor 54 separates the dried base product particles using screens to divide the agglomerated dried base product particles into preferably four or five piles.

Particles larger than ½ inch or so are scalped off the shaking conveyor 54 by screen 56. These large particles are broken down and recirculated through the process. Particles that pass through a 20 mesh sieve screen are collected in a first bin 58. These particles are usually rejected as being too fine and dusty, however, they do have some utility in connection with a fire retardant product discussed below. If not being utilized as such, these particles too can be recirculated.

The remaining particles are preferably divided into two or more groups. The screen sizes utilized to divide the particles can be varied as desired to meet different applications or markets. As an example, particles passing through a 12 mesh sieve screen comprise a medium dried product particle and are collected in bin 60. Particles too large to pass through the 12 mesh sieve screen but which pass through an 8 mesh sieve screen are collected in bin 62 as an coarser dried product particle. Finally, particles too large to pass through the 8 mesh sieve screen but which pass through a 6 mesh screen are collected in bin 64 as the coarsest dried product particles.

The use of the different sized particles is substantially market driven. The particles may be blended to provide an end product having various particle sizes or they may be segregated still further to provide end products having a substantially homogeneous particle size. The finer particles have the best sorptive capabilities while the courser particles have a more vitrified surface. The optimum particle sizes for use in a particular end use application can be easily determined by experimentation.

The proportions of paper mill sludge, calcium oxide and diatomite utilized in the present invention depends somewhat on the composition of the particular paper mill sludge being used. As discussed above, paper mill sludge may vary in composition depending on the manufacturer from which it is obtained. At one end is paper mill sludge having a low clay content, i.e. paper mill sludge having a clay content of 3–5 percent or less. At the other end, or high end, are paper mill sludges having clay contents of approximately 30 percent or more. The following examples illustrate preferred processes and products provided in accordance with the present invention.

EXAMPLE 1

With respect to low clay content paper mill sludge, an example is provided for 1000 lbs. of paper mill sludge based upon the dry weight of fiber contained therein. The 1000 lbs. of paper mill sludge is discharged onto a cut and fold mixer at a predetermined discharge rate to create a reactant stream. 150–300 lbs. of calcium oxide is metered into the reactant stream to obtain an intermediate sludge/calcium oxide mixture. It should be noted that up to 50 percent of the calcium oxide component can be substituted with a fly ash material. Fly ash may be added to vary the desired characteristics of the end product. Fly ash makes the end product have a better thickening quality. If the paper mill sludge is of a normal 60 to 70 percent moisture content, then no additional water need be added. If the sludge has a below normal moisture content, then additional water may be added, either immediately before or after the calcium oxide is added or contemporaneously therewith, to raise the water content of the mixture to a sufficient level. The sludge/calcium oxide combination is conveyed and mixed on the cut and fold mixer for a period of 3 to 60 seconds. Diatomite is then input into the reactant stream. The total amount of diatomite added is between 250–500 lbs. and can reach as high as 1000 lbs. (a 1:1 ratio of diatomite and fiber). The reactant stream is further mixed by the action of the cut and fold mixer. A base product mass is obtained comprising the paper mill sludge reacted with the calcium oxide and water, if any, along with the diatomite.

EXAMPLE 2

With respect to a paper mill sludge having a high clay content, i.e. a clay content of about 30 percent, the following example is provided.

1000 lbs. of paper mill sludge based upon the dry weight of fiber contained therein is metered onto a cut and fold mixer to form a reactant stream. Calcium oxide is metered into the paper mill sludge reactant stream until a total of 200 to 400 lbs. of calcium oxide has been added. In this case fly ash can be substituted for calcium oxide only in small amounts due to the high clay content of the paper mill sludge. Additional calcium oxide is generally added to paper mill sludge having a high clay content in order to deodorize the sludge. High clay content sludge has a distinctly foul odor which must be neutralized for use in consumer products. The calcium oxide mixes with the paper mill sludge as it is conveyed along the cut and fold mixer for a time period of 3 to 60 seconds. Additional water may be added, either immediately before or after the calcium oxide is added or contemporaneously therewith, to raise the water content of the mixture to a sufficient level and to provide surfactants to assist in the breakdown of the clay component. For 1000 lbs. of paper mill sludge (based upon the dry weight of fiber), 25 gallons of water is usually added. The surfactants are preferably input with water at a ratio of about 2 percent by weight of the water. BREM 17 or 18 by Petrick USA are acceptable surfactants. After the calcium oxide has had sufficient time to thoroughly admix with the paper mill sludge diatomite is discharged into the reactant stream. A total of 250 to 350 lbs. of diatomite is metered into the reactant stream. A base product mass comprising the paper mill sludge, calcium oxide and diatomite is obtained.

The water content of typical paper mill sludge is about 60 to 70 percent by weight. Bone dry reactants are added to the paper mill sludge so as not to increase the water content. The typical water content of the base product mass is 45 to 50 percent by weight. The typical water content in the dried product particles will range from 5 to 30 percent, but is most typically 15 percent.

The typical fiber content of the dried base product is approximately 50–55 percent by weight. Of course, the undried base product mass has a lower percentage of fiber content by weight owing to the additional water content.

The bulk density of the dried product particles normally ranges from 35 to 50 lbs. per cubic foot. If totally dry, the bulk density is close to 35 lbs./ft$^3$. Since most of the dried base product particles have a 10–15 percent moisture content, however, the most common bulk density of these particles is about 40–45 lbs./ft$^3$. The bulk density of the undried base product mass is increased as a function of the higher moisture content.

The base product mass or dried base product mass can be weighed, measured, blended and packaged in manners well known in the art.

Products Derived From the Integrated Process

A variety of products can be generated from the integrated manufacturing process disclosed above. One product, termed a first end product, is a soil supplement or "wet earth" material that has valuable soil conditioning properties. The first end product or soil supplement comprises the processed reactant stream of paper mill sludge, calcium oxide and diatomite obtained at the transfer point 32 in the integrated manufacturing process, i.e. the base product mass. At this point the reactant stream has not yet been routed to the shaper/mixer 34 or dryer 42. This end product is pulled out of the process at this point to maintain a higher level of water content in the end product. Through additive input 28 additional optional additives such as humic acid or other soil conditioners can be provided to the reactant stream. The additives may be input in various amounts, depending upon the moisture content of the base product mass and the absorptive capacity remaining. This product is useful as a soil conditioner as it imports organic matter to the soil. This soil supplement product can be made using 100 percent paper mill sludge as the starting material for the reactant stream or, alternatively, some of the paper mill sludge can be substituted with reground paper to give the product some added texture. In addition to humic acid as an additive, fertilizers, microbes or other soil treatment chemicals can be input into the reactant stream at or after the diatomite is added.

Another useful end product obtained by the integrated manufacturing process is a floor dry material for absorbing spilled wastes including hydrocarbons. The amounts of calcium oxide and diatomite added to the reactant stream may be varied slightly to obtain different textures of material useful in different applications. The dried base product mass can be used as the foundation of the floor dry material or alternatively, the base product mass can be utilized. Surfactants or degreasers may be optionally added to the base product mass or dried base product mass in an amount that does not unduly affect the overall absorptive capacity of the product. Degreasers or penetrants assist the floor dry material to penetrate the surface of spilled hydrocarbons. This makes it easier for the hydrocarbons to be absorbed by the floor dry material. The surface tension on the hydrocarbon is broken and it is more readily absorbed.

Another useful end product obtained using the base product mass or dried base product particles is a cat litter or waste absorbent product. The ratio of components of the reactant stream are similar to that of the floor dry. Up to 30 to 40 percent shredded paper can be added to the product for large animal usage. For a cat litter product it has been found useful to add fragrances or cedar chips to the base product mass or dried base product particles. Bentonite may also be added in amounts up to 50 percent to obtain a clumping cat litter where feces and urine may be easily removed from the litter box.

Another interesting alternate end product comprises a fire guard material. This material essentially comprises the dried product mass screened to a fine micron size, i.e. it passes through an 11 mesh sieve screen. Additional diatomite is then mixed into the dried base product mass at a ratio of about 3 to 2 by volume of the dried base product mass to the additional diatomite. The particle sizes of the additional diatomite are mostly between 250–500 microns. The additional diatomite is added so that the finished product is extremely dry. This product is useful as a fire retardant when added to plastic products. It has been found that when 45 percent by weight of the fire guard material is used in combination with 55 percent by weight plastic, fire retardant products are obtained. Products such as fire retardant shingles or siding have wide applicability in the construction and housing industries.

A still further alternate end product is cellulosic insulation. This material consists essentially of the dried base product mass but with a courser granule. It is applied inside structures such as walls and attics and is allowed to dry. Sodium silicate may be optionally added to facilitate the installation of the material. It is generally blown into place. Boric acid or other fire retardant agents can also be added as a fire retardant kicker. It has been found that only 5 percent by weight of boric acid makes an effective fire retardant cellulosic insulation.

One agricultural product obtained from the integrated manufacturing process is an agricultural carrier. This product comprises the base product mass or dried base product mass with additional diatomite added into the reactant stream. This improves the absorbability of the granules. The agricultural carrier product may be routed through the shaper/mixer 34 so that a harder ball or agglomeration is obtained. Insecticides, herbicides, pesticides or fertilizers can be added to the product, which then functions as a carrier of the chemical. This allows for the managed application of agricultural chemicals while at the same time the soil is conditioned. A related product is a seed carrier. This product uses substantially dry base product particles to avoid germination of the seed prior to application.

Board materials such as fire brick and aggregate filler for cementitious materials are also obtainable by this process. These products utilize the dried base product particles that have bypassed the shaper/mixer 34.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A process for reclaiming paper mill sludge and for producing a number of end products derived therefrom comprising:

continuously discharging an amount of said sludge onto a mixer/conveyor to create a reactant stream;

adding an amount of calcium oxide into said reactant stream to form an intermediate mixture;

allowing said intermediate mixture to fully react;

after said intermediate mixture has fully reacted, adding an amount of diatomite into said reactant stream, said reactant stream now comprising a base product mass;

making said base product mass or a portion thereof available for additive addition and removal from said reactant stream;

routing a remaining portion of said base product mass to a transfer point;

at said transfer point, making said remaining portion of said base product mass or a portion thereof available for shaping;

drying said remaining portion of said base product mass, or a portion thereof, to obtain dried base product particles;

separating said dried base product particles according to particle size to form segregated dried base product particles, said segregated dried base product particles being ready for admixture with other components to form alternate end products.

2. The process according to claim 1 further comprising adding said diatomite into said reactant stream 3 to 60 seconds following the addition of said calcium oxide to said reactant stream.

3. The process according to claim 1 further comprising adding an amount of a soil conditioner to said base product mass to obtain said first end product which comprises a soil supplement.

4. The process according to claim 1 further comprising adding an amount of surfactants and degreasers to said dried base product particles to form a floor dry material.

5. The process according to claim 1 further comprising adding an amount of a clumping agent to said dried base product particles to form an animal waste absorbent material.

6. The process according to claim 1 further comprising adding an amount of additional diatomite to said dried base product particles to form a fire retardant material.

7. The process according to claim 1 further comprising adding an amount of sodium silicate and boric acid to said dried base product particles to form cellulosic insulation.

8. The intermediate mixture formed in accordance with the process of claim 1.

9. The base product mass formed in accordance with the process of claim 1.

10. The dried base product particles formed in accordance with the process of claim 1.

11. A process for producing useful particles from paper mill sludge, comprising:

treating said sludge with calcium oxide to form an intermediate mixture;

mixing diatomite into said intermediate mixture to form product agglomerations;

shaping said product agglomerations to obtain shaped product agglomerations;

drying said shaped product agglomerations to obtain dried product particles; and segregating said dried product particles according to size.

12. The process according to claim 11, further comprising adding surfactants to said sludge in connection with the formation of said intermediate mixture.

13. The process according to claim 12, wherein said surfactants are added with water.

14. The process according to claim 11, wherein said diatomite is finely ground to particle sizes of 300–350 microns.

15. The process according to claim 11, further comprising drying said shaped product agglomerations in a rotating dryer at a temperature and for a residency time sufficient to achieve an exit temperature of said dried product particles of 250° F.

16. The dried product particles formed in accordance with the process of claim 11.

17. An absorbant comprising said dried product particles formed in accordance with the process of claim 11.

18. A soil supplement comprising said dried product particles formed in accordance with the process of claim 11.

19. A fire retardant comprising said dried product particles formed in accordance with the process of claim 11.

20. An insulating material comprising said dried product particles formed in accordance with the process of claim 11.

* * * * *